United States Patent [19]

Kadner et al.

[11] 4,119,563

[45] Oct. 10, 1978

[54] PROCESS FOR THE PRODUCTION OF FUEL AND FERTILE PARTICLES

[75] Inventors: Martin Kadner, Maintal; Karl-Gerhard Hackstein; Gerhard Spener, both of Hanau, Germany

[73] Assignee: Hobeg Hochtemperaturreaktor-Brennelement GmbH, Hanau, Germany

[21] Appl. No.: 759,550

[22] Filed: Jan. 14, 1977

[30] Foreign Application Priority Data

Jan. 17, 1976 [DE] Fed. Rep. of Germany ....... 2601684

[51] Int. Cl.$^2$ ............................................. G21C 21/16
[52] U.S. Cl. ............................... 252/301.1 S; 264/0.5
[58] Field of Search .................. 252/301.1 S; 423/11, 423/15; 260/429.1; 264/0.5

[56] References Cited

U.S. PATENT DOCUMENTS

| | | | |
|---|---|---|---|
| 2,904,572 | 9/1959 | Bilger et al. | 260/429.1 |
| 3,158,614 | 11/1964 | Seaborg et al. | 260/429.1 |
| 3,171,715 | 3/1965 | Kleinsteuber | 252/301.1 S |
| 3,290,122 | 12/1966 | Clinton et al. | 252/301.1 S |
| 3,301,790 | 1/1967 | Fitch et al. | 252/301.1 S |
| 3,397,257 | 8/1968 | Brambilla et al. | 252/301.1 S |
| 3,617,584 | 11/1971 | Flack et al. | 252/301.1 S |
| 3,755,158 | 8/1973 | Inazuka et al. | 423/11 |
| 3,933,679 | 1/1976 | Weitzel et al. | 252/301.1 S |
| 4,006,174 | 2/1977 | Calderazzo et al. | 260/429.1 |

FOREIGN PATENT DOCUMENTS

1,430,558   1/1966   France ....................................... 423/11

Primary Examiner—Benjamin R. Padgett
Assistant Examiner—Deborah L. Kyle
Attorney, Agent, or Firm—Cushman, Darby & Cushman

[57] ABSTRACT

There is provided a process for the production of spherical fuel and/or fertile oxide or carbide particles for a nuclear reactor, especially a high temperature reactor, by casting an aqueous solution of a uranium and/or a thorium and/or plutonium salt, as well as in the case of the production of carbide particles finely dispersed carbon also, from a vibrating nozzle, passing the drops formed through an ammonia containing gas zone into an ammoniacal precipitation bath with subsequent washing, drying and sintering or melting. To the aqueous solution there is added individually or in admixture a water soluble or water miscible monomeric hydrocarbon having an aldehyde, keto, ether, amino, imino, phenol, carboxylic acid or carboxylic acid amide group, which substituted hydrocarbons form stable adducts with uranium, thorium and plutonium in aqueous alkaline solution, which adducts cannot be washed out with water and which does not impart to the solution a viscosity of over 15 cp at 20° C.

31 Claims, No Drawings

PROCESS FOR THE PRODUCTION OF FUEL AND FERTILE PARTICLES

BACKGROUND OF THE INVENTION

The invention concerns a process for the production of spherical fuel and/or fertile particles with a high throughput by casting uranium and/or thorium and/or plutonium compound containing solutions from a vibrating nozzle through an ammonia containing gas zone into an ammoniacal precipitation bath with subsequent washing, drying and sintering or melting of the formed and solidifed drops.

All fuel elements for high temperature reactors contain the fuel and fertile material in the form of coated particles. These coated particles consist of uniform spherical particles of the oxide or carbide of uranium and/or thorium and/or plutonium which are jacketed by layers of pyrolytic carbon and silicon carbide in order to retain the fission products.

At the present time essentially the following types of particles are of significance: uranium oxide ($UO_2$), uranium carbide ($UC_2$), thorium oxide ($ThO_2$) and uranium-thorium oxide mixed crystals $(U,Th)O_2$. According to the requirement the particles are between 200 and 600$\mu$, the density should be as high as possible.

For the feed-breed-fuel cycle preferred for the high temperature power reactors, there are produced both thorium oxide-kernels with a diameter of about 500$\mu$ and also uranium carbide-fissile kernels with a diameter of about 200$\mu$.

In the further progress of the production of fuel elements these fissile particles and fertile particles were provided with coatings of pyrolytic carbon and silicon carbide which serve to retain the fission products in the operation of the reactor. Thereby the fission gas pressure occurring in the particle interiors, the strains formed by neutron emission and the stresses caused by temperature changes must be intercepted by these layers. This is best possible if these layers are precise spherical shells and the kernels have an exact spherical shape.

There are known various processes employed for the production of such particles. Besides powder metallurgical granulation processes which are not capable to yield completely exact spherical shapes wet chemical processes were developed which for industrial and economical reasons are preferred to dry processes. In practically all wet chemical processes an aqueous solution or a sol is produced from a uranium, thorium and/or plutonium compound. In the case of carbide production this liquid contains finely divided carbon in dispersion, Then drops are formed from the solution or sol which are as spherical as possible and which are solidified with retention of the spherical shape. The solidified particles are, in case there are present additives or waste products e.g. ammonium nitrate which are to be removed, washed, then dried, calcined and, in the case of oxide particles, sintered. For the production of carbide the particles after the calcination are brought to reaction and either sintered at 1700°–2000° C. or melted at about 2500° C.

One of these known processes is the so-called sol-gel method, according to which an aqueous thorium oxide or thorium-uranium oxide sol is produced and is dropped into an organic solvent, e.g., 2-ethyl hexanol, which is not miscible with water. The solvent used has a solubility for water of several volume percent. The viscous sol drops are caused to get by removal of water and solified (Kleinsteuber U.S. Pat. No. 3,171,715 and Clinton U.S. Pat. No. 3,290,122).

According to another process the aqueous solution of compounds of the materials from which the spherical particles should be formed is mixed with a resin, preferably methyl cellulose, which imparts a very strong increase in viscosity in dropping into alkaline solution, so that the spherical shape of the drops remains in the slow penetration of the base into the interior of the drops and the precipitation and hardening associated therewith (Brambilla German Pat. No. 1,212,841). The addition of monohydric or polyhydric alcohols to this viscous drop solution improves the surface tension and therewith the formation of the sphere (Neri German Pat. No. 1,671,051).

From Fleichhauer German Auslegeschrift No. 1,542,346 there is known a process in which an emulsion is formed from a metal salt solution with an oil, this emulsion is treated with polyvinyl alcohol (PVA) and dropped into the ammonia solution, whereby the drops are solidified very quickly. Oil and PVA are washed out of the solidified particles and these particles dried and finished.

From Nickel et al. German Auslegeschrift No. 1,960,289 there is known a process for the production of spherical particles from uranium dioxide in which solid hexamethylene tetramine (hexa) is dissolved in an aqueous solution of uranyl nitrate and urea and this cooled concentrated solution dropped into hot oil. The spherical particles solidified thereby the ammonia split out from the hexa and washed, dried and sintered.

A further process is known from German Offenlegungsschrift No. 2,147,472 in which the metal salt solution or the sol is dropped into a ketone phase which stands over an aqueous phase. In German Offenlegungsschrift No. 2,323,072 it is additionally disclosed that for improving the particle density and the yield it is advantageous to mix the metal salt solution with ammonium nitrate and urea before dropped into the ketone phase.

From both of the last named German OS and Graham et al. U.S. Pat. No. 3,204,934 and Flack U.S. Pat. No. 3,617,584 it is known to subject the liquid jet to a vibration in the dropping in order to produce uniform drops with increased throughput. All of the previously mentioned processes have the disadvantage that the increase in throughput which would be possible by increase of the frequency of drops is limited either because of the adverse hindering of the drops in the liquid in which they are formed on leaving the dropping nozzle or through the necessarily high viscosity of the dropping liquid. Besides several of the processes mentioned have the disadvantage that polymeric organic materials are used as additives for the dropping solution which either even at slight changes of the pH or through aging in the solution change their condition and thereby change the viscosity of the solution so that it is difficult in large scale production always to produce exactly uniform dropping solutions and to work them up, whereby, particularly in the drying and the further heating of the particles formed there occur high amount of scrap due to breaking and disintegration.

Therefore, it has been proposed in Huschka German published patent application No. P 2,459,445 and related Huschka U.S. application Ser. No. 638,662 filed Dec. 8, 1975 to make possible an increase in throughput in the drop formation from uranium and/or thorium solutions treated with PVA by flowing the vibrating or oscillating liquid stream after leaving the nozzle through a first gaseous falling zone free of ammonia and in which the exactly spherical liquid drops next fall through a second gaseous falling zone containing ammonia and thereby (also at a very high frequency of drops) are so well flowed around on all sides that they are uniformly solidified and upon entering an aqueous ammonia solution located in the falling column below the second gaseous falling zone are not deformed. However, also with this process there can only be obtained a maximum of 80,000 drops per minute per nozzle, depending on the viscosity of the solution. The entire disclosure of the Huschka United States application is hereby incorporated by reference and relied upon.

SUMMARY OF THE INVENTION

The problem solved by the present invention is to increase the throughput to at least 20,000 to 200,000 drops per minute per nozzle in the production of spherical fissile and/or fertile particles from solutions of heavy metal salts, particularly salts of uranium and/or thorium and/or plutonium and thereby to so stabilize the roundness of the first formed exactly spherical drops from the heavy metal salt solutions both in the fall through the gas phase as well as in the impact with the surface of the alkaline ammonia solution that a deformation is excluded and that the good stability and spherical shape of the solidified particles are maintained in the further working up by washing, drying and heating to the sintering temperature.

This problem was solved according to the invention by adding to the aqueous solutions of uranium and/or thorium and/or plutonium salts such water soluble or water miscible monomeric hydrocarbons or heterocyclic compounds with functional aldehyde, keto, ether, amino, imino, nitrile, phenol, acid, e.g., carboxylic acid or acid amide, e.g., acetamide, alone or mixture of them which forms stable adducts in aqueous alkaline solution with uranium, thorium and plutonium, which cannot be washed out with water and which does not impart to the solution a viscosity of more than 15 cp at 20° C., whereby of said mixtures of monomers are used such only which do not react with each other forming a polymer or resin at the temperature occurring in the solution and in the falling drops which is between 5° and 40° centigrade.

While nitrates are used in the working examples, there can be used in any other uranium and/or thorium and/or plutonium salts which are soluble in water but insoluble in ammonia solution. Thus there can be used any of the uranyl and thorium salts set forth in Hackstein et al. U.S. Pat. No. 3,535,264, the entire disclosure of which is hereby incorporated by reference, and relied upon, e.g., there can be used the chlorides, oxychlorides, fluorides, sulphates and acetates.

It was surprisingly found that monomeric hydrocarbons or heterocyclic compounds which have the named functional groups, even in the absence of polymeric organic materials build such stable adducts with uranium, thorium and plutonium in the precipitation reaction with ammonia that the spherically shaped drops from uranium and/or plutonium and/or thorium salt solution are already sufficiently hardened in the ammonia gas falling zone before immersion in the precipitation bath and that the spherical shape of these hardened particles in the collection in the precipitation bath and in the subsequent further working up to microspheres remains intact through washing, drying and heating.

The throughput is determinative of the industrial efficiency of the process for production of nuclear fuel and fertile products. Because of the smallness of the particles of for example 0.2 to 0.5 mm diameter and their slight weight of the order of 0.05 to 0.5 mg, higher throughput means the production of many drops of more than 20,000 or 100,000 per minute per nozzle in a chain of drops so that for the hardening in the ammonia gas only a fraction of a second is available. Surprisingly, it has now been proven that the addition of monomeric substituted hydrocarbons or heterocyclic compounds of the types set forth above to the heavy metal salt solution not only substantially makes easier the production of numerous drops per minute but also that these drops also immediately solidify to spheres in the ammonia gas without their deforming upon entering the liquid surface of the precipitation bath.

The physical properties of the solution such as viscosity and surface tension are of substantial influence for the disintegration of a liquid jet into uniform drops under the influence of an oscillating system insofar as with increasing viscosity and surface tension the production of a large number of drops from a jet is made difficult or impossible, so that in the short time available spherical, discrete drops cannot be formed. Disadvantages of this type which must be considered in the known processes because of the use of highly viscous polymeric materials, such as polyvinyl alcohol, cellulose derivatives or polymeric sugars, and limit the throughput are overcome according to the present invention through addition of the aforementioned substituted hydrocarbons or heterocyclic compounds yielding a viscosity of the solution of below 15 cp. It has surprisingly been shown that with a series of different types of substituted monomeric hydrocarbon or heterocyclic compounds by their addition to the heavy metal salt solution on the one hand there occurs no viscosity increase or only a slight viscosity increase of 2 to 5 cp while on the other hand other materials cause a large increase in viscosity. Such materials causing a large increase in viscosity are not suited for the process of the invention. By corresponding selection of the chemical compound there can be produced the necessary concentration needed for a quick hardening of the drops in the ammonia gas without mentionable increase in viscosity and consequently without limitation on throughput. This is particularly advantageous in the production of carbide nuclear fuels. In such production finely dispersed carbon black is added to the uranium salt solution which as a rule leads to a further increase in viscosity. Thus for example according to the aforementioned, known process of production in which there is added urea and hexamethylenetetramine to the cooled uranium salt solution (Nickel, German Patent No. 1,960,289), there could not be produced small drops for 200μ uranium nuclei because of the increase in viscosity up to 100 cp caused by the addition of carbon, while according to the process of the invention from a uranyl nitrate-carbon-dispersion having a viscosity of only 10 cp, with addition of propionaldehyde for example, there can be produced without difficulty at frequencies up to 3000 Hertz up to 180,000 uniform drops per minute per nozzle having a diameter of 0.4 to 0.8 mm, corresponding to a $UC_2$ nuclear fuel diameter of 150–250μ, which as hardened particles have a good spherical shape.

By combination of two or more of these compounds it is possible to adjust for the optimum viscosity for any size of drops while maintaining the high throughput.

Thereby, there is given a great flexibility in the production of different sized uniform drops or microspheres as well as a wide region of use for the process of the invention.

A further advantage of the invention is that the heavy metal concentration of the solution to be converted into drops can be varied within wide limits, for example, between 100 and 600 g/l with the addition of the monomeric substituted hydrocarbons because even at higher heavy metal concentration the viscosity is increased only insignificantly and the drops retain their spherical shape in the hardening in the ammonia gas and do not break open because of inner tensions as is observed in using polymeric materials. The use of concentrated heavy metal salt solution is particularly advantageous for the production of larger microspheres having a diameter of 0.6 to 0.8 mm because the drops can be held small and because of the smaller flow resistance can remain spherical in the precipitation. Therefore, it is recommended to so select the concentration range for uranium and/or thorium and/or plutonium in the solution that the drop diameter remains between 0.5 and 1.5 mm.

As suitable monomeric substituted hydrocarbon compounds according to the invention there has been found a series of water soluble or water miscible organic compounds which have one or more functional groups belonging to the classes of aldehydes, ketones, ethers, amines, carboxylic acids, aminocarboxylic acids, carboxylic acid amides, carboxylic acid imides or phenols.

Of the aldehydes, formaldehyde, acetaldehyde, propionaldehyde and furfural have the most favorable influence on the stabilization of drops. With acetaldehyde and propionaldehyde there is sufficient 0.5 mole per mole of thorium for a thorium nitrate solution containing 400 g Th/l, for example. A measurable increase in viscosity after the addition of the organic compound to the thorium nitrate solution was not ascertained thereby, the viscosity only amounted to 4 to 5 cp at 20° C. The use of these chemical materials has proven particularly simply. Thorium nitrate solution having a pH of 3.8 which was produced by neutralization of the strongly acid solution with ammonia gas at temperatures below 20° C., was mixed with stirring with the named organic liquids (i.e., aldehydes) in the stated mixing proportion at room temperature. The clear, stable solution obtained was changed into drops in know manner while this solution was forced through a nozzle under the influence of an electromagnetic oscillating system whereby the liquid jet (or stream) flowing out at a frequency of 400 Hertz in air broke down into 24,000 drops per minute which hardened to solid spherical particles during the falling through an ammonia gas atmosphere 20 to 30 cm long and were collected in the ammoniacal precipitation bath.

In using the ketone, acetone, as well as the cyclic ethers dioxane, tetrahydrofuran the same ratio of solution and the result was produced as with the use of the previously mentioned aldehyde. These materials also caused a form stabilization of the drops in the ammonia gas with addition of 0.5 mole per mole of thorium. Other ketones which can be applied are e.g. acetylacetone, 2-butanone (methylethylketone), acetoin (3-hydroxy-2-butanone) or 1-diethylamino-2-propanone. Other ethers which can be used are e.g. glycolethylideneether, glycolmethylenether, 2-methoxyethanol and 2-ethoxyethanol.

Of the carboxylic acids the liquid pyruvic acid proved particularly suitable, especially for the production of somewhat higher viscosity solutions up to 15 cp whose can be advantageous in the production of larger drops or microspheres of, for example, 0.6 to 0.8 mm diameter. Other ketocarboxylic acids which can be applied are e.g. acetoacetic acid (3-oxobutanoic acid) and levulinic acid (acetopropionic acid).

A similar effect is observed in using several aminocarboxylic acids such as glycine, leucine, e.g., 1-leucine, alanine, isoleucine or asparagine.

Also carboxylic acid amides such as formamide, urea, acetamide, propionamide and N-dimethylacetamide as well as imides such as succinimide or N-diacetylmethylamine stabilize the spherical shape of the drops by hardening in ammonia gas. For this purpose amounts of 0.5 mole per mole of thorium are sufficient whereby no measurable increase in the viscosity of the solution occurs. These materials are either mixed, as with formaldehyde, or dissolved in corresponding amounts with the uranium and/or thorium salt solutions.

Furthermore, it has surprisingly been found that amines also are very suited for stabilization of the spherical shape of the drops if they are previously neutralized with acids, e.g., nitric acid, sulfuric acid or hydrochloric acid, to ammonium salts. Thus, for example, basic ethylene diamine leads to a precipitation in the thorium nitrate solution, an ammonium salt solution of the ethylene diamine made by neutralizing 2 moles of nitric acid per mole of diamine, however, can be mixed with the thorium nitrate solution to a clear, stable solution containing 290 grams of thorium and 37 grams of ethylene diamine per liter, which likewise hardens in drop form in ammonia gas to spherically shaped particles. Other amines which can be used are e.g. aminoethene (ethenylamine), dimethylamine and diethylamine. Water soluble phenols, preferably resorcinol and pyrogallol, likewise cause a stabilization and hardening of drops in ammonia gas. In using concentrated thorium nitrate solution having a pH of 3.8, which contains 430 grams of thorium per liter of solution, 0.5 mole of resorcinol per mole of thorium is sufficient for the hardening of the drops, while with more strongly diluted thorium nitrate solution containing 250 g Th/l 1 to 2 moles of resorcinol per mole of thorium is necessary for the production of a good spherical shape of the particles. Further phenolic compounds which can be applied are e.g. hydroquinone, catechol and hydroxyquinol.

The viscosity at 20° C. increases only to a trifling extent in the dissolving of the resorcinol from 4 cp up to 8 to 12 cp and the solution was unlimitedly stable. The spherical particles washed free of ammonium nitrate with water is slowly colored black in the air, brought about by the oxygen sensitivity of the resorcinol still present. Similar results were produced with pyrogallol that likewise in a concentration of 0.5 mole per mole of thorium stabilized the spherical shape of the drops. Because of its oxygen sensitivity, the pyrogallol quickly colored the particles blck.

In both of the above examples, the throughput increased to more than 24,000 drops per minute.

The invention is not limited to the previously illustrated classes of material, but also includes water soluble monomeric carbon and hydrogen containing compounds of the heterocyclic series which contain the above named functional groups. Thus it was found for example that alloxan (N,N'-mesoxalyl urea), a heterocyclic, water soluble six membered ring compound containing carboxyl and imino groups (it is a hexahydropyrimidine) likewise cause a solidification of drops from concentrated thorium nitrate solution having a pH of 3.8 in ammonia gas while the absence of this material leads to a complete destruction of the shape of the drops upon entering the surface of the precipitation bath. Other heterocyclic compounds which can be applied are e.g. pyridine and pyrimidine.

A favorable influence on the production of spherically shaped particles can be had by the simultaneous use of two or more of the above mentioned water soluble monomeric substituted hydrocarbon compounds. For the production of $(Th,U)O_2$ - mixed oxide spheres there has been tested for example the addition of 0.25 mole of glycine to a thorium nitrate-uranyl nitrate-resorcinol solution (molar ratio 0.9:0.1:0.5) by which there are produced optimum conditions for the stability of the solution, for drop production and for the spherical shape of the particles. With such a mixture from 1 mole of resorcinol and 0.25 mole of glycine per mole of uranium in a uranyl nitrate solution having a pH of 2 and containing 300 grams U/l there were also produced spherical particles from ammonium diuranate at high throughput which subsequently were worked up in known manner by washing, drying and reductive sintering to $UO_2$ micropheres having a diameter of $200\mu$. Thereby the throughput per nozzle could be increased to 180,000 drops per minute, corresponding to an amount of uranium of more than 0.4 kg per hour per nozzle. In a solution of the same composition there was additionally dispersed carbon black in an amount of 60 g/l, whereby there was only a slight increase in viscosity. At a throughput of 90,000 drops per nozzle per minute there were obtained black, round particles having a diameter of 0.8 mm which in known way were worked up by reaction sintering $UC_2$ spheres having a diameter of $220\mu$. The temperature of the solutions used to form drops in the nozzle normally is room temperature, but a lower temperature of 5° to 15° centigrade is preferred if otherwise a reaction between the monomeric compound and uranium or thorium would occur. In case of low solubility of the monomeric compound the temperature can be raised a little up to 40° centigrade.

The process can comprise, consist essentially of or consist of the steps set forth employing compositions comprising consisting essentially of or consisting of the materials set forth.

The process of the invention will be explained further in connection with the following examples.

DESCRIPTION OF THE PREFERRED EMBODIMENTS

Example 1

A thorium nitrate solution containing 500 grams of thorium per liter was neutralized with ammonia gas to a pH of 3 under cooling to 5° to 10° C., whereby there was formed a clear solution containing 444 grams of thorium per liter. Using stirring at room temperature there were dissolved in 1860 ml this solution which contained 826 grams of thorium, 213 grams of resorcinol and 87 grams of glycine and there were added an additional 780 ml of water as well as 170 ml of uranyl nitrate solution which contined 490 grams of uranium per liter. This clear solution having a volume of 3 liters which contained per liter 303 grams of Th + U in the weight ratio Th:U=10.1 as well as 71 grams of resorcinol and 29 grams of glycine and had a viscosity of 11 cp was split according to known methods into equally sized drops while the solution was forced through a nozzle under the action of an electromagnetic oscillating system, whereby the liquid stream flowing out at a frequency of 400 Hertz in air formed 24,000 drops per minute which hardened to solid spherical particles during the falling through a 20 cm long ammonia gas atmosphere, which particles were collected in an ammoniacal precipitation bath as spheres of thorium oxide hydrate and ammonium diuranate. The precipitation bath contained 5 percent by weight ammonia.

The molar ratio of the substituted hydrocarbon compound to thorium plus uranium amounted to 0.5:1 for resorcinol and 0.3:1 for glycine. The spherical particles were washed free of ammonium nitrate with water and isopropanol, dried, calcined in air at 300° C. and sintered under hydrogen at 1700° C. to $(Th,U)O_2$ - mixed oxide spheres of high density (greater than 98% of the theoretical density). The analysis of a representative amount of particles of over 2000 particles gave an average diameter of $391\mu$ with a standard deviation of $8.8\mu$ for 99% of all particles with 99% probability, which corresponds to a variation coefficient of 2.3%. The investigation of the spherical shape showed that the ratio of the largest to the smallest diameter per sphere at more than 80% of all spheres was between 1.00 and 1.05:1 and that less than 1% had a diameter ratio of 1.10:1. The throughput per nozzle amounted to 0.4 kg thorium plus uranium per hour in the form of $400\mu$ spheres, which means over $1.4 \times 10^6$ particles.

Example 2

523 ml of thorium nitrate solution having a pH of 3.8 which contained 444 grams of thorium per liter were mixed under stirring with 48.5 grams of pyruvic acid and after 15 minutes there were mixed in an additional 110 ml and 48.5 ml of uranyl nitrate solution (490 grams U/l). The clear solution having a volume of 730 ml had a viscosity of 13 cp at 20° C. and contained per liter 350 grams of thorium plus uranium in the weight ratio Th:U=10:1 as well as 66 grams of pyruvic acid. Even after a long standing time of 24 hours there was not observed a crystallization or a turbidity of the solution. This solution was changed into 48,000 drops per minute as described in Example 1, which drops hardened to solid, spherical shapes in ammonia gas and ammonia solution, washed free of ammonium nitrate and dried in air. The molar ratio of pyruvic acid to thorium plus uranium amounted to 0.5:1.

Example 3

There were dissolved in 306 ml of uranyl nitrate solution having a pH of 2 which solution contained 490 grams per liter of uranium, 71 grams of resorcinol and 12 grams of glycine and there were added 110 ml of water, whereby there was formed a clear solution having a viscosity of 2 cp at 20° C. which contained per liter 300 grams of uranium, 142 grams of resorcinol and 24 grams of glycine, corresponding to a mole ratio resorcinol-to-uranium of 1:1 and a glycine to uranium mole ratio of 0.25:1. This solution remained clear for more than 48 hours and was as described in Example 1 forced through a nozzle, whereby the liquid stream flowing out formed 120,000 uniform drops, which were hardened in ammonia gas and were collected in ammonia solution in the form of solid spheres from ammonium diuranate and had a diameter of 0.8 mm. The further treatment by washing for the purpose of removal of ammonium nitrate, drying, calcining and sintering under hydrogen at 1700° C. resulted in spherical nuclear fuel spheres of dense $UO_2$ having a diameter of 200μ. Measurements showed that the ratio of largest to smallest diameter per sphere at 86% of all the particles was below 1.05 and in the remainder of the particles did not exceed 1.10.

Example 4

There were dispersed 30 grams of carbon black in a solution of the composition set forth in Example 3. This suspension having a viscosity of 10 cp at 20° C. under continuous stirring was converted into black spherical particles in the manner described in Example 1. At a frequency of 1500 Hertz the throughput per nozzle per minute was 90,000 drops, corresponding to 0.2 kg of uranium per hour per nozzle. After the washing and drying the particles were reacted and sintered at 1850° C. under argon to $UC_2$ nuclear fuel particles having a diameter of 220μ.

Example 5

There were dissolved 118.5 grams of resorcinol in 260 ml of thorium nitrate solution having a pH of 3.8 and containing 481 grams of thorium per liter. By dilution with 150 ml of water there was formed a solution which contained 250 grams of thorium and 237 grams of resorcinol per liter, corresponding to a resorcinol-thorium molar ratio of 2:1. The solution had a viscosity at 20° C. of 9 cp. The solution was forced through a nozzle at a vibrator frequency of 427 Hertz in the manner described in Example 1 and converted into 25,700 drops per minute, which drops were solidified in a 30 cm long ammonia gas atmosphere into spheres of thorium oxide hydrate and collected in 5 percent by weight aqueous ammonia solution. The spherical particles were freed of ammonia nitrate by washing, dried and calcined and sintered at 1500° C. in air to dense $ThO_2$-fertile material particles having a diameter of 503μ. The measurement of a representative sample of 200 spheres showed that 98% thereof had a diameter ratio from the largest to the smallest diameter of each particle below 1.1. Although each particle on the average weighed only 0.65 mg the throughput amounted to 1 kg $ThO_2$ per nozzle per hour.

Example 6

76.3 grams of acetamide and 12.1 grams of glycine were dissolved in 303 ml of thorium nitrate solution having a pH of 3.8 and containing 444 grams Th/l and there were added with stirring an additional 90 ml of water and 28.5 ml of uranyl nitrate solution having a concentration of 490 grams U/l. The clear solution contained per liter 300 grams of Th + U in the weight ratio Th:U=10:1, 152.6 grams of acetamide and 24.2 grams of glycine and had a viscosity of 11 cp at 20° C. As described in Example 1 there were produced per nozzle per minute 36,000 spherical particles which were changed by heat treatment including sintering under hydrogen at 1700° C. into mixed oxide spheres of $(Th,U)O_2$ of good sphericity having a diameter of 400μ.

In this example, the molar ratio of acetamide - Th + U = 2:1 and glycine - Th + U = 0.25:1.

Example 7

50 grams of pyrogallol were dissolved in 500 ml of thorium nitrate solution having a pH of 3.8 and containing 206 g Th, corresponding to a mole ratio of pyrogallol-thorium of 0.4:1. This solution having a viscosity of 12 cp at 20° C. was converted into particles of good spherical form in the manner set forth in Example 1. These particles upon drying in air were colored black.

Example 8

564 ml of thorium nitrate solution having a pH of 3.8 and a content of 232 grams Th (1 mole) were mixed with 29 grams of propionaldehyde (0.5 mole). The clear solution had a viscosity of 5 cp at 20° C. and similar to Example 1 was converted into spheres of precipitated thorium oxide hydrate. The washed and dried particles were marked by good roundness.

Example 9

564 ml of thorium nitrate solution having a pH of 3.8 and a content of 232 grams of Th (1 mole) were mixed with 29 grams of acetone (0.5 mole) and similar to Example 1 converted into 24,000 discrete particles per nozzle per minute. The viscosity of the solution was 5 cp at 20° C.

Example 10

564 ml of thorium nitrate solution having a pH of 3.8 containing 232 grams of Th (1 mole) were mixed with 44 grams of dioxane (0.5 mole). The clear solution had a viscosity of 5 cp at 20° C. and was worked into microspheres in a manner similar to Example 1. The solidified particles were washed and dried and were marked by good spherical shape.

The use of 36 grams of tetrahydrofurane (0.5 mole) in place of dioxane gave similarly good results. The viscosity of the solution likewise amounted to 5 cp at 20° C.

Example 11

There were dissolved in 540 ml of thorium nitrate solution having a pH of 3.8 and containing 232 grams of Th (1 mole) with strong stirring slowly 10 grams of l-leucine (0.077 mole) to form a clear solution having a viscosity of 4 cp at 20° C. This solution containing 394 grams Th/l similar to Example 1 was converted into spherically shaped particles of good roundness, subsequently washed free of ammonium nitrate and dried in air.

Example 12

8.1 grams of glycine (0.1 mole) were dissolved in 540 ml of thorium nitrate solution having a pH of 3.8 and containing 232 grams of Th (1 mole). The concentration per liter of solution was 428 grams of Th and 15 grams of glycine, the viscosity was 8 cp at 20° C.

This solution was converted into spheres of thorium oxide hydrate in the same manner as Example 1, washed free of nitrate with ammonia water and dried at 90° C. in air. There could not be detected any glycine by analysis of the wash water. The dried particles contained 1.3 weight % carbon.

Example 13

29.5 grams of acetamide (0.5 mole) were dissolved at room temperature in 564 ml of thorium nitrate solution having a pH of 3.8 and containing 232 grams of Th (1 mole). The clear solution having a viscosity of 5 cp at 20° C. was converted into spherical particles in a manner similar to Example 1. These spheres were washed and then dried in air. The use of 22.5 grams of formamide (0.5 mole) in place of acetamide likewise gave thorium oxide hydrate spheres. The viscosity of this solution likewise amount to 5 cp at 20° C.

Example 14

49.5 grams of succinimide were dissolved with stirring in 564 ml of thorium nitrate solution having a pH of 3.8 and containing 232 grams Th (1 mole). The clear solution which had a viscosity of 5 cp at 20° C. was worked up as described in Example 1 to dried microspheres of good spherical shape having a diameter of 1 mm.

Example 15 p 30 grams of ethylenediamine (0.5 mole) with cooling were mixed with 100 ml of water and neutralized with 70 ml of 65% nitric acid in 50 ml of water to a pH of 6. This neutralized solution with stirring was mixed with 564 ml of thorium nitrate solution having a pH of 3.8 and containing 232 grams Th (1 mole) whereupon there was formed a clear solution of 800 ml containing 290 grams th/l. The viscosity was 4 cp at 20° C.

In a manner similar to that described in Example 1 this solution was changed into 24,000 drops per nozzle per minute which drops were hardened in ammonia gas and collected in ammonia solution as spherically shaped particles of good form.

What is claimed is:

1. In a process for the production of solid spherical particles of a member of the group consisting of fuel oxides, fertile oxides, fuel carbides, fertile carbides and mixtures of such oxides and carbides consisting essentially of forcing an aqueous solution of a member of the group consisting of water soluble uranium salts, water soluble thorium salts, water soluble plutonium salts and mixtures of such salts, and in the case of the production of carbide particles also containing finely dispersed carbon therein, from a vibrating nozzle, passing the drops formed thereby through an ammonia containing gas zone and thereafter into an ammonia solution precipitation bath, the improvement consisting essentially of increasing the throughput of drops, employing in the solution passed through said nozzle at least one monomer of the group consisting of (1) water soluble and water miscible monomeric hydrocarbons substituted with at least one member of the group consisting of aldehyde, keto, ether, amino, imino, phenolic hydroxyl, carboxylic acid and carboxylamide group and (2) water soluble and water miscible monomeric heterocyclic compounds substituted with at least one member of the group consisting of carbonyl, imino and nitrile groups, said substituted hydrocarbon or substituted heterocyclic compound forming a stable adduct with uranium, thorium or plutonium in alkaline aqueous solution, said adduct being characterized by not being able to be washed out with water and by not imparting to the solution a viscosity above 15 cp at 20° C., whereby in the case a mixture of more than one monomer is applied there is used such a mixture only in which the monomers do not react with each other forming a resin or polymer at the temperature occurring in the solution and in the falling drops which is between 5° and 40° centigrade, the mole ratio of the monomer to the total of uranium, thorium and plutonium in the solution being from 0.077 to 3:1, said monomer hardening the drops in the ammonia gas.

2. A process according to claim 1 including the steps of (1) washing, (2) drying and (3) sintering or melting the solid spherical particles formed.

3. A process according to claim 1 wherein the mole ratio of the monomer to the total of uranium, thorium and plutonium in the solution is from 0.5 to 3:1.

4. A process according to claim 1 wherein the aqueous solution comprises a member of the group consisting of uranium salts, thorium salts and mixtures of such salts.

5. A process according to claim 4 wherein the mole ratio of the monomer to the total of uranium and thorium in the solution is from 0.5 to 3:1.

6. A process according to claim 1 wherein the monomer comprises a water soluble aldehyde.

7. A process according to claim 6 wherein the aldehyde is formaldehyde, acetaldehyde, propionaldehyde or furfuraldehyde.

8. A process according to claim 1 wherein the monomer comprises a water soluble ketone.

9. A process according to claim 8 wherein the ketone is acetone.

10. A process according to claim 1 wherein the monomer comprises a water soluble substituted hydrocarbon which is a heterocyclic ether free of substituents other than the ether oxygen atoms.

11. A process according to claim 10 wherein the ether is dioxane or tetrahydrofurane.

12. A process according to claim 1 wherein the monomer comprises a water soluble ketocarboxylic acid or a water soluble aminocarboxylic acid.

13. A process according to claim 12 wherein the monomer comprises pyruvic acid, glycine or leucine or a mixture of at least two of these.

14. A process according to claim 12 wherein the monomer comprises pyruvic acid.

15. A process according to claim 12 wherein the monomer comprises a water soluble alpha aminocarboxylic acid.

16. A process according to claim 15 wherein the aminocarboxylic acid is glycine or l-leucine.

17. A process according to claim 1 wherein the monomer comprises an amide or imide.

18. A process according to claim 17 wherein the monomer comprises formamide, acetamide or succinimide.

19. A process according to claim 17 wherein the monomer comprises an amide.

20. A process according to claim 19 wherein the amide is formamide or acetamide.

21. A process according to claim 18 wherein the monomer comprises an imide.

22. A process according to claim 21 wherein the imide is succinimide.

23. A process according to claim 1 wherein the monomer comprises the salt formed by neutralizing ethylenediamine with an acid.

24. A process according to claim 1 wherein the monomer comprises a phenol.

25. A process according to claim 24 wherein the phenol comprises resorcinol or pyrogallol.

26. A process according to claim 1 wherein the monomer is a heterocyclic compound containing a carboxyl, imino or nitrile.

27. A process according to claim 26 wherein the heterocyclic compound is a hexahydropyrimidine.

28. A process according to claim 27 wherein the hexahydropyrimidine is alloxan.

29. A process according to claim 1 wherein there is produced an oxide.

30. A process according to claim 1 wherein there is produced a carbide.

31. A process according to claim 1 wherein there is produced a mixture of an oxide and a carbide.

* * * * *